F. R. HATCH.
HORSESHOE ATTACHMENT.
APPLICATION FILED JULY 22, 1910.
981,559.
Patented Jan. 10, 1911.
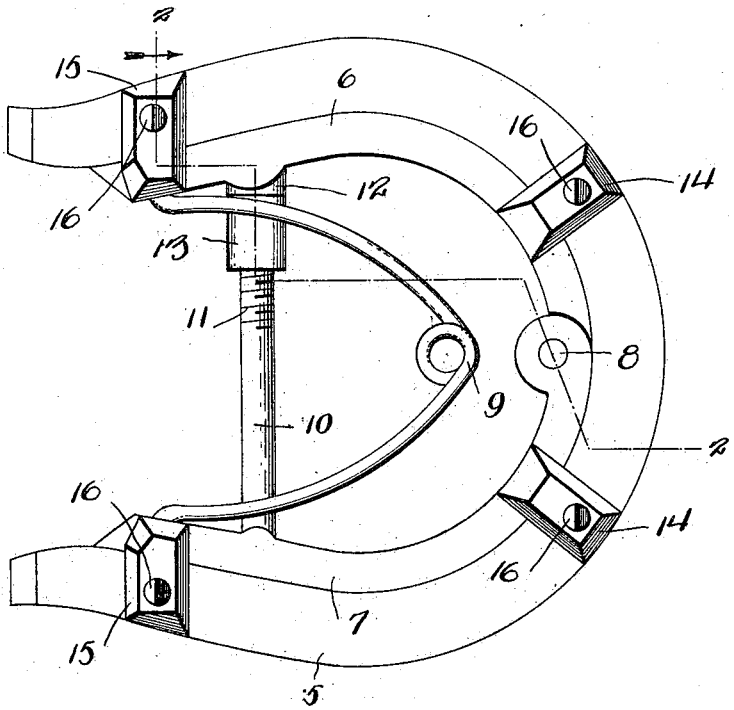
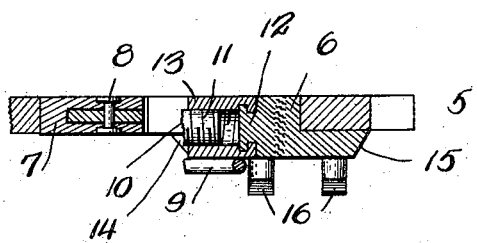
Witnesses
C. C. Richardson.
F. Allen.
Inventor
Freeman R. Hatch,
By Victor J. Evans
Attorney

UNITED STATES PATENT OFFICE.

FREEMAN R. HATCH, OF EAST BRIDGEWATER, MASSACHUSETTS.

HORSESHOE ATTACHMENT.

981,559.  Specification of Letters Patent.  Patented Jan. 10, 1911.

Application filed July 22, 1910. Serial No. 573,271.

*To all whom it may concern:*

Be it known that I, FREEMAN R. HATCH, a citizen of the United States, residing at East Bridgewater, in the county of Plymouth and State of Massachusetts, have invented new and useful Improvements in Horseshoe Attachments, of which the following is a specification.

This invention relates to improvements in attachments for horseshoes, and has for its object the provision of an anti-slipping device which may be fixedly secured to a horseshoe, while the latter is in position on the animal's hoof.

Another object is the provision of an attachment which is frictionally held in engagement with a horseshoe, whereby the employment of nails and other analogous fastening means which are usually employed to secure devices of this kind to a horseshoe, will be eliminated.

With these and other objects in view, which will more fully hereinafter appear, the present invention consists in certain novel details of construction and arrangement of parts, hereinafter fully described, illustrated in the accompanying drawings, and more particularly pointed out in the appended claims; it being understood that various changes in the form, proportion, size, and minor details of the device may be made, within the scope of the appended claims, without departing from the spirit or sacrificing any of the advantages of the invention.

In the accompanying drawings, forming part of the specification;—Figure 1 is a plan view of the device showing it applied to a horseshoe. Fig. 2 is a detail cross section on the line 2—2 of Fig. 1.

Similar numerals of reference are employed to designate corresponding parts throughout.

The horseshoe is designated in general by the numeral 5 and since the same is of well-known construction a detail description thereof need not be given.

The device forming the subject matter of the present invention includes a pair of sections 6 and 7 pivotally united at one end, as shown at 8 and when in operative position conforms to the configuration of the horseshoe 5. The sections 6 and 7 are of metal and each corresponds in length approximately to the distance between the middle portion and one of the heel calks of an ordinary horseshoe, and in width and thickness, corresponds approximately to the width and thickness of the portions of an ordinary horseshoe included between the heel and toe calks. By reference now to Fig. 1 it will be seen that the sections 6 and 7 are curved their outer sides conforming to the configuration of the inner side of the horseshoe 5 so that when positioned as shown in Fig. 1 with the pivotal point 8 in alinement with the middle portion of the calk of the horseshoe 5 the faces of the sections will be coincident with the upper and lower faces of the horseshoe.

The free end portions of the sections 6 and 7 are held in spaced relation by means of a hair-pin-shaped spring 9, the opposite terminals of which are anchored in the inner faces of the free end portions of the sections 6 and 7 and the medial portion of which is coiled, and lies adjacent to the pivotal point 8 of the sections 6 and 7. The spring acts to hold the outer sides of the sections 6 and 7 in engagement with the inner side of the horseshoe during the operation of positioning the device. In order to prevent accidental disengagement of the device after the same has been applied the following construction is employed.

By reference now to Fig. 1 it will be seen that extending inwardly from the inner side of the section 7 is a cross bar 10, the free end portion of which is screw threaded as shown at 11. Arranged on the inner side of the section 6 and at a point diametrically opposite to the point of connection between the cross bar 10 and section 7 is a bushing 12, which receives the free end portion of the cross bar 10. Screwed onto the threaded portion of the cross bar 11 is a collar 13, one end of which bears on the bushing 12 this collar operating to move the free end portion of the cross bar out of the socket when turned in one direction, thus increasing the friction between the surfaces of the sections 6 and 7 and the horseshoe.

By reference now to the drawings it will be seen that the sections 6 and 7 are provided adjacent to their opposite ends with plates 14 and 15, these plates extending outwardly and bearing on the lower face of the shoe 5. The plates are of such length that their outer ends will extend to the outer edge of the shoe 5, and depending from the lower faces of the plates are calks 16. The calks 16 may be of any preferred construction formed integral or otherwise secured to the plates 15.

From the foregoing, it is evident that I have provided a device which is comparatively simple in structure and inexpensive in manufacture, embodying few parts and these so arranged that the danger of derangement will be reduced to a minimum.

I claim:—

1. An attachment for horseshoes comprising a pair of spring-pressed members pivoted together at one end and having their outer sides conforming to the inner side of a horseshoe, calks attached to said members, and means for holding the outer sides of said members in binding engagement with the inner side of a horseshoe.

2. An attachment for horseshoes comprising a pair of spring-pressed members pivoted together at one end and having their outer sides conforming to the inner side of a horseshoe, calks attached to said members, and extensible means for holding the outer side of said member in binding engagement with the inner side of a horseshoe.

In testimony whereof I affix my signature in presence of two witnesses.

FREEMAN R. HATCH.

Witnesses:
 GEORGE HUDSON,
 FRED L. KEITH.